(12) United States Patent
Ben-Ari

(10) Patent No.: US 10,809,366 B2
(45) Date of Patent: Oct. 20, 2020

(54) MULTIMODAL RADAR SYSTEM

(71) Applicant: ARTSYS360 LTD., Holon (IL)

(72) Inventor: Erez Ben-Ari, Rishon le Zion (IL)

(73) Assignee: ARTSYS360 LTD., Holon (IL)

( * ) Notice: Subject to any disclaimer, the term of this patent is extended or adjusted under 35 U.S.C. 154(b) by 385 days.

(21) Appl. No.: 15/548,899

(22) PCT Filed: Feb. 4, 2016

(86) PCT No.: PCT/US2016/016507
§ 371 (c)(1),
(2) Date: Aug. 4, 2017

(87) PCT Pub. No.: WO2016/126908
PCT Pub. Date: Aug. 11, 2016

(65) Prior Publication Data
US 2018/0031689 A1 Feb. 1, 2018

Related U.S. Application Data

(60) Provisional application No. 62/111,775, filed on Feb. 4, 2015.

(51) Int. Cl.
*G01S 13/44* (2006.01)
*H01Q 13/04* (2006.01)
*H01Q 21/20* (2006.01)

(52) U.S. Cl.
CPC ......... *G01S 13/4454* (2013.01); *H01Q 13/04* (2013.01); *H01Q 21/205* (2013.01)

(58) Field of Classification Search
CPC .............................. G01S 13/4454; H01Q 13/04
See application file for complete search history.

(56) References Cited

U.S. PATENT DOCUMENTS 2,954,558 A 9/1960 Honey et al.
3,568,203 A 3/1971 Venters et al.
(Continued)

FOREIGN PATENT DOCUMENTS

CN 102122173 A 3/2012
CN 104122527 A 10/2014

OTHER PUBLICATIONS

Butler, et al., Beam-Forming Matrix Simplifies Design of Electronically Scanned Antennas, Electronic Design, Apr. 1961, pp. 170-173, vol. 9.
(Continued)

*Primary Examiner* — Marcus E Windrich
(74) *Attorney, Agent, or Firm* — Browdy and Neimark, P.L.L.C.

(57) ABSTRACT

A radar system and method for determining location of targets, wherein the energy reflected from an object is received by the omnidirectional antenna elements and the received RF signal is downconverted to an intermediate frequency (IF) signal. The IF signals are digitized. The digitized IF signals received at the first omnidirectional antenna are digitally processed so as to form modal beams with opposite phase slope as output signals. The digitized IF signal received at the second omnidirectional antenna is digitally processed as to form a reference signal of phase reference. Phase differences between the signals and the reference signals are determined, such that each phase difference includes a first component proportional to the azimuth of the arriving signal and a second component corresponding to the elevation of the arriving signal, from which the azimuth and the elevation of the arriving signal can be extracted.

25 Claims, 12 Drawing Sheets

(56) References Cited

U.S. PATENT DOCUMENTS

| | | | |
|---|---|---|---|
| 4,203,114 A | 5/1980 | Gerst et al. | |
| 4,297,704 A | 10/1981 | Marom et al. | |
| 5,128,682 A | 7/1992 | Kruger | |
| 5,379,224 A | 1/1995 | Brown et al. | |
| 5,648,982 A * | 7/1997 | Durrant | H04B 1/707 375/146 |
| 6,032,028 A * | 2/2000 | Dickey | H03C 3/40 332/117 |
| 6,104,346 A * | 8/2000 | Rudish | G01S 3/04 342/156 |
| 6,195,043 B1 * | 2/2001 | Azzarelli | G01S 3/06 342/362 |
| 6,420,993 B1 | 7/2002 | Varon | |
| 6,441,783 B1 * | 8/2002 | Dean | G01S 7/032 342/372 |
| 6,618,008 B1 * | 9/2003 | Scholz | G01S 7/032 342/427 |
| 6,697,017 B1 | 2/2004 | Shmuel | |
| 7,427,953 B2 | 9/2008 | Chiang et al. | |
| 7,831,214 B1 * | 11/2010 | Stockmann | G01S 7/034 455/78 |
| 7,868,817 B2 | 1/2011 | Meyers et al. | |
| 7,982,664 B1 * | 7/2011 | Uscinowicz | H01Q 3/267 342/165 |
| 8,334,808 B2 | 12/2012 | Remez et al. | |
| 8,335,808 B2 | 12/2012 | Shieh | |
| 8,380,425 B2 | 2/2013 | Duggan et al. | |
| 8,466,829 B1 * | 6/2013 | Volman | G01S 3/48 342/133 |
| 8,754,811 B1 * | 6/2014 | Uscinowicz | H01Q 3/267 342/375 |
| 8,886,459 B2 | 11/2014 | Stefani et al. | |
| 9,455,700 B1 * | 9/2016 | Xiao | H04B 1/44 |
| 9,739,870 B1 | 8/2017 | Beckman et al. | |
| 10,401,467 B2 * | 9/2019 | Moghaddasi | H01Q 3/30 |
| 2002/0175859 A1 * | 11/2002 | Newberg | H01Q 3/2682 342/375 |
| 2006/0114158 A1 | 6/2006 | Chiang et al. | |
| 2006/0139210 A1 * | 6/2006 | Stavros | H01Q 21/0025 343/700 MS |
| 2009/0303126 A1 * | 12/2009 | Jain | G01S 13/288 342/368 |
| 2010/0085235 A1 | 4/2010 | Meyers et al. | |
| 2010/0121575 A1 | 5/2010 | Aldridge et al. | |
| 2011/0130636 A1 | 6/2011 | Daniel et al. | |
| 2011/0304508 A1 * | 12/2011 | Remez | H01Q 13/04 342/442 |
| 2013/0027240 A1 | 1/2013 | Chowdhury | |
| 2014/0032034 A1 | 1/2014 | Raptopoulos et al. | |
| 2014/0070979 A1 | 3/2014 | Andersson et al. | |
| 2014/0111376 A1 * | 4/2014 | Bench | G01S 5/021 342/357.51 |
| 2017/0045613 A1 | 2/2017 | Wang | |

OTHER PUBLICATIONS

Gallager, et al., A Distributed Algorithm for Minimum-Weight Spanning Trees, ACM Transactions on Programming Languages and Systems (TOPLAS), Jan. 1983, pp. 66-77, vol. 5, issue 1.

* cited by examiner

MULTIMODAL RADAR SYSTEM

FIELD AND BACKGROUND OF THE INVENTION

The present invention, in some embodiments thereof, relates to radar systems and more particularly to radar systems and methods for inferring the direction-of-arrival (DOA) of reflected signals.

Radars are object-detection systems that use radio waves to determine range, azimuth, elevation and/or velocity of the objects.

In order to obtain the direction of an object, radar systems incorporate several techniques of direction finding (DF) or DOA such as phased-array, beam forming, beam steering, interferometry, multimodal principles et cetera.

Radar systems usually estimate each property (azimuth angle or elevation angle) separately requiring a complicated and usually expensive constructions and designs to achieve high level and accurate estimations of azimuth and elevation since most systems use two different sub systems to estimate each property.

One commonly known method is to use two multimodal antennas wherein one antenna is used to estimate the azimuth of the arriving signal and the two multimodal antennas are used to estimate the elevation, using interferometry techniques. In these methods, each of multimodal antennas produces at least two modes: a zero mode and a first-order phase mode allowing extracting the azimuth using one of the antennas and the elevation using the other antenna. The azimuth and elevation are extracted separately using two separate techniques: a multimodal technique is used for extracting the azimuth and an interferometry technique is used for extracting the elevation.

U.S. Pat. No. 7,427,953, which is incorporated herein by reference in its entirety, discloses an antenna system for inferring the DOA of received signals, where the system includes two antenna arrays, each having a plurality of antenna elements, two first stage multi-mode-port matrices, at least one second stage multi-mode-port matrix, an azimuth phase detector, an elevation amplitude detector, a plurality of phase shifters and a transceiver. The antenna arrays and the first stage multi-mode-port matrices form a plurality of orthogonal omnidirectional modes. Each of the phase modes has a characteristic phase set. Two of the modes' phases are used to infer the DOA in azimuth. The second stage multi-mode-port matrix forms a sum-mode and a difference-mode used to infer the DOA in elevation of the impinging received signals. The sum and difference method is an alternative method to inter the elevation by comparing amplitudes instead of comparing phases as required in interferometry. The second antenna is also multimodal so the two equal antennas are utilized to shape a radiation pattern of low side-lobes in the direction characterized by the measured elevation and azimuth.

U.S. Pat. No. 3,568,203, which is incorporated herein by reference in its entirety, discloses a DF antenna assembly comprising a horn antenna structure and associated microwave circuitry that allow the inferring of DOA in azimuth of an impinging signal. The assembly enables producing signals at output ports of a hybrid circuit that varies in phase as a linear function of the azimuth angle of the impinging received signal, where a comparison of these signals with a reference signal enables to infer the DOA in azimuth of the received signal at the antenna. The elevation is found separately by a second antenna that is perpendicular to the horizon plane, wherein the second antenna comprises a linear array of at least two omnidirectional antenna elements (dipoles), and the elevation is found by the interferometry technique by measuring the phase difference between two dipoles of the second antenna.

U.S. Pat. No. 2,954,558, which is incorporated herein by reference in its entirety, discloses an antenna system comprising a single biconical radiator and microwave energy propagating means that allow inferring the DOA in azimuth of impinging received signals regardless of their elevation by allowing the propagation of only TEM and $TE_{10}$ radial-line modes responsive of the energy from the arriving signals, wherein the radial-line modes are transformed to TEM and $TE_{11}$ coaxial-line modes. The TEM and $TE_{11}$ modes propagate through four rectangular waveguides and waveguide transition means, where the TEM mode establishes equal signals in phase and amplitude through the waveguides and the $TE_{11}$ mode establishes respective oppositely phased signals, where the azimuth of the arriving signals is extracted from the phase difference between the TEM and $TE_{11}$ modes.

All of the above mentioned patents disclose systems and assemblies that only allow extraction of the azimuth independently of the elevation of an arriving signal, whereas another process and measuring and more hardware is required to infer the elevation of the arriving signal. The additional process may require a different arrangement of the system only enabling a separate process for determining the elevation of the arriving signal.

U.S. Pat. No. 8,334,808, being incorporated herein by reference in its entirety as if fully disclosed herein, discloses an antenna system for estimating the DOA in azimuth and elevation of arriving signals, comprising: a first omnidirectional antenna; and a second omnidirectional antenna, which is located coexially above the first omnidirectional antenna at a predefined distance D. The first omnidirectional antenna is configured to transform the received arriving signal into output signals with opposite phase slopes, and the second omnidirectional antenna is configured to transform the received signal into a reference signal. The antenna system allows the extraction of: a first phase difference between the phase of the first output signal and the reference phase; and a second phase difference between the phase of the second output signal and the reference phase, where each phase difference includes a first component proportional to the azimuth of the arriving signal and a second component corresponding to the elevation of the arriving signal, from which the azimuth and the elevation of the arriving signal can be extracted.

All of the above mentioned patents disclose systems and assemblies that infer the DOA in azimuth of the received impinging signal by implementing the multimodal principle.

Inferring the bearing of an impinging wave according to the principle of multimodal phase modes is described in the following lines, referring to FIG. 1. An array of antenna elements 1 is equispaced, but not necessarily, in a circular formation. This array feeds a RF Butler matrix 2 which is an N×N modal beam-forming network with N inputs and N outputs. The RF Butler matrix 2 comprises RF Hybrid couplers and phase shifters as described in Butler and Lowe, "Beam-Forming Matrix Simplifies Design of Electronically Scanned Antennas," Electronic Design. Vol. 9. April 1961, pp. 170-173, the entirety of which is incorporated by reference as if fully disclosed herein. All received RF signals fed into the RF Butler matrix 2 are phase-shifted and summed and outputted through the N different output ports. The different outputs are also referred to as modal beams. For modal beam M, in an equispaced array of N elements, the weighted sum is given by:

$$S(M) = \frac{1}{\sqrt{N}} \sum_{i=0}^{N-1} s(i) e^{j\frac{2\pi i M}{N}}$$

where s(i) is the signal out of element i and S(M) is the signal out of modal beam M. Namely, the RF Butler Matrix 2 performs an operation that is equivalent to a Discrete Fourier Transform (DFT) hence it may be regarded as a spatial processor producing modal beams in the RF domain. The modal beams are characterized by having a quasi-omnidirectional amplitude pattern hence signal strength does not depend on the azimuthal angle of arrival of an impinging wave. In addition, the phase of modal beam M designated by θ(M) is quasi-proportional to the azimuth angle of arrival of an impinging wave. With φ being the DOA of the impinging wave relative to the array location and M being the constant of proportionality, the following equality holds:

$$\theta(M) = M\varphi$$

By measuring the modal phases, the azimuth of the impinging wave is extracted.

Shortcomings of prior art implementations making use of RF Butler Matrix 2 or other passive feed networks that allow modal beams, stem from the limitations imposed by passive transmission lines:

1. RF Butler Matrix 2 and other passive transmission lines feed networks are complicated, imposing high mechanical constrains and tolerances hence high cost
2. RF Butler Matrix 2 and other passive transmission lines feed networks suffer from considerable insertion loss. Such feed networks are mostly incorporated in the system front ends before any amplification resulted with degradation in sensitivity. This problem may be overcome if low-noise amplifiers are incorporated between the antenna elements 1 and the feed networks at the expense of complexity, cost and reduced accuracies because of mismatching between amplifiers.
3. RF Butler matrix 2 and other passive transmission lines feed networks possess inherent inaccuracies resulting in deviations from the ideal phase-azimuth relationship, generating large bearing estimation errors
4. The overall system performance is very sensitive to measurement errors, clutter and multi signals.
5. RF Butler Matrix 2 and other passive transmission lines feed networks possess a fixed phase shift, hence do not allow null-steering.
6. RF Butler matrices possess a fixed phase shift hence not suitable for sparse antenna arrays.
7. RF Butler matrix 2 and other passive transmission lines feed networks only allow the detection of signals DOA in azimuth thus limiting radar systems to only two dimensional operation.

All of the above mentioned shortcomings thus suggest a widely recognized need for, and it would be highly advantageous to have, a radar system and a method for broadband reception and bearing measurement of signals reflected both in azimuth and elevation performed in the digital domain rather than in the RF domain while avoiding highly complex, expensive components such as RF Butler matrix 2 or other passive transmission line feed networks.

SUMMARY OF INVENTION

According to some embodiments of the invention, there is provided a radar system covering in azimuth from 0° to 360° within a predefined range of elevations below and above the horizon. The range of elevations may be, for example, from −45° to 45° elevation below and above the horizon, respectively. The radar system comprising an antenna system for estimating the direction-of-arrival (DOA), such as but not limited to, the antenna system described in U.S. Pat. No. 8,334,808, which is incorporated herein by reference as if fully disclosed herein. However, in contrast to the system taught in U.S. Pat. No. 8,335,808, the present invention relates to a radar system and method for inferring the direction-of-arrival (DOA) of reflected signals covering 0° to 360° in azimuth within a predefined range of elevations below and above the horizon by incorporating the multimodal and interferometer direction-finding (DF) techniques in the digital domain.

The radar antenna system may comprise: a first omnidirectional antenna; and a second omnidirectional antenna, which is located coaxially above or below the first omnidirectional antenna and separated therefrom at a predefined distance D. The first omnidirectional antenna and second omnidirectional antenna may comprise a continuous multimodal and omnidirectional antenna or a discrete multimodal and omnidirectional antenna.

Each of the elements of the first omnidirectional antenna and the second omnidirectional antenna may be configured to receive and/or transmit radio frequency (RF) signals by connection to a respective receive and/or transmit (Rx/Tx) module.

Each of the Rx/Tx modules allows excitation of microwave signals in each respective antenna element resulting in radiated energy at a predefined direction. Each of the Rx/Tx modules may also be excited simultaneously with any other of the Rx/Tx modules to thereby excite several antenna elements so as to steer the radiated energy into one or several predefined directions.

The energy reflected off an object is received by the antenna elements and the RxfFx modules downconvert the received radio frequency (RF) signal to an intermediate frequency (IF) signal, preferably by mixing with a local oscillator (LO) signal, where the receiving channels are homodyne receivers of any implementation or heterodyne receivers of any implementation. Preferably, the Rx/Tx modules include signal conditioning elements such as amplifiers and/or filters and/or power limiters and/or phase shifters and/or couplers et cetera.

The IF signals are processed so as to infer the bearing, i.e., the azimuth and elevation, of the impinging reflected RF signal.

Each one of the IF signals is digitized. The digitizers are analog-to-digital convertors (ADCs). The ADCs are preferably located on the digital-signal-processing card (DSPC) but may also be located on the Rx/Tx modules. In the latter case, the digitized data is fed from the Rx/Tx modules into the DSPC.

The DSPC performs the data processing for detection and identification and tracking of one or more objects or targets.

The DSPC may be comprised of signal conditioning elements such as amplifiers and/or filters and/or power-limiters and/or phase shifters and/or couplers et cetera. The DSPC may further be comprised of a digital signal processor (DSP) and/or programmable logic device and/or microprocessor and/or microcontroller and/or memory unit et cetera.

The digitized IF signals received at the first omnidirectional antenna are processed so as to form modal beams with opposite phase slopes by complex weighting each digitized input and summing the weighted digitized signals For example, for an equispaced array of N elements or feeds, the complex weights are given by:

$$w_{(i)} = e^{\pm j \frac{2\pi M i}{N}}$$

where w(i) are the complex weights, $j=\sqrt{-1}$, M=(0, 1, 2 . . . ) is the phase slope, i is the module index and the (±) sign determines the slope direction, namely positive or negative.

The complex weights may be programmed so as to produce any antenna array spatial pattern. The spatial patterns can be any of an omnidirectional pattern, steered directional beam, a spatial null (or several nulls) pointed to undesired reception directions.

The digitized IF signal received at the second omnidirectional is processed as to form a phase reference signal.

The LO signal source is preferably generated in the exciter module. Preferably, the exciter module further includes a distribution mechanism for distributing the LO signal to the Rx/Tx modules. Preferably, the distribution mechanism includes signal conditioning elements such as power dividers and/or power combiners and/or frequency control mechanism and/or pulsing mechanism and/or amplifiers and/or filters and/or phase shifters and/or couplers et cetera. The LO signal source may also be located on the Rx/Tx modules. In the latter case, the Rx/Tx module may further include a frequency control mechanism and/or pulsing mechanism and/or amplifiers and/or filters and/or phase shifters and/or couplers et cetera.

The Tx signal is preferably generated in the exciter module. Preferably, the exciter module further includes a distribution mechanism for distributing the Tx signals for the Rx/Tx modules. Preferably, the distribution mechanism includes signal conditioning elements such as power dividers and/or power combiners and/or frequency control mechanism and/or pulsing mechanism and/or amplifiers and/or filters and/or phase shifters and/or couplers et cetera. The Tx signal source may also be located on the Rx/Tx modules. In the latter case, the Rx/Tx module may further include a frequency control mechanism and/or pulsing mechanism and/or amplifiers and/or filters and/or phase shifters and/or couplers et cetera The timing and clocking signals are preferably generated in the exciter module. Preferably, the exciter module further includes a distribution mechanism for distributing the timing and clocking signals to other modules in the system. Preferably, the distribution mechanism includes signal conditioning elements such as power dividers and/or power combiners and/or frequency control mechanism and/or pulsing mechanism and/or amplifiers and/or filters and/or phase shifters and/or couplers et cetera. The timing and clocking signals may also be located on the DSPC. In the latter case, the DSPC module further includes a distribution mechanism for distributing the timing signals to other modules in the system. Preferably, the distribution mechanism includes signal conditioning elements such as power dividers and/or power combiners and/or frequency control mechanism and/or pulsing mechanism and/or amplifiers and/or filters and/or phase shifters and/or couplers et cetera.

The improved performance of the present invention over the prior art includes:
1. Creating 3D radar using Multimodal and Interferometer techniques.
2. Better bearing measurement accuracy and stability, due to elimination of errors introduced by other analog methods and means.
3. Reduced system complexity and enhanced system modularity due to elimination of other analog methods and means.
4. Implementability of other DOA methods.
5. Flexibility to generate radiation patterns other than omnidirectional such as steered directional beam, a spatial null or several nulls pointed to undesired reception directions.

DETAILED DESCRIPTION

Figure 1:
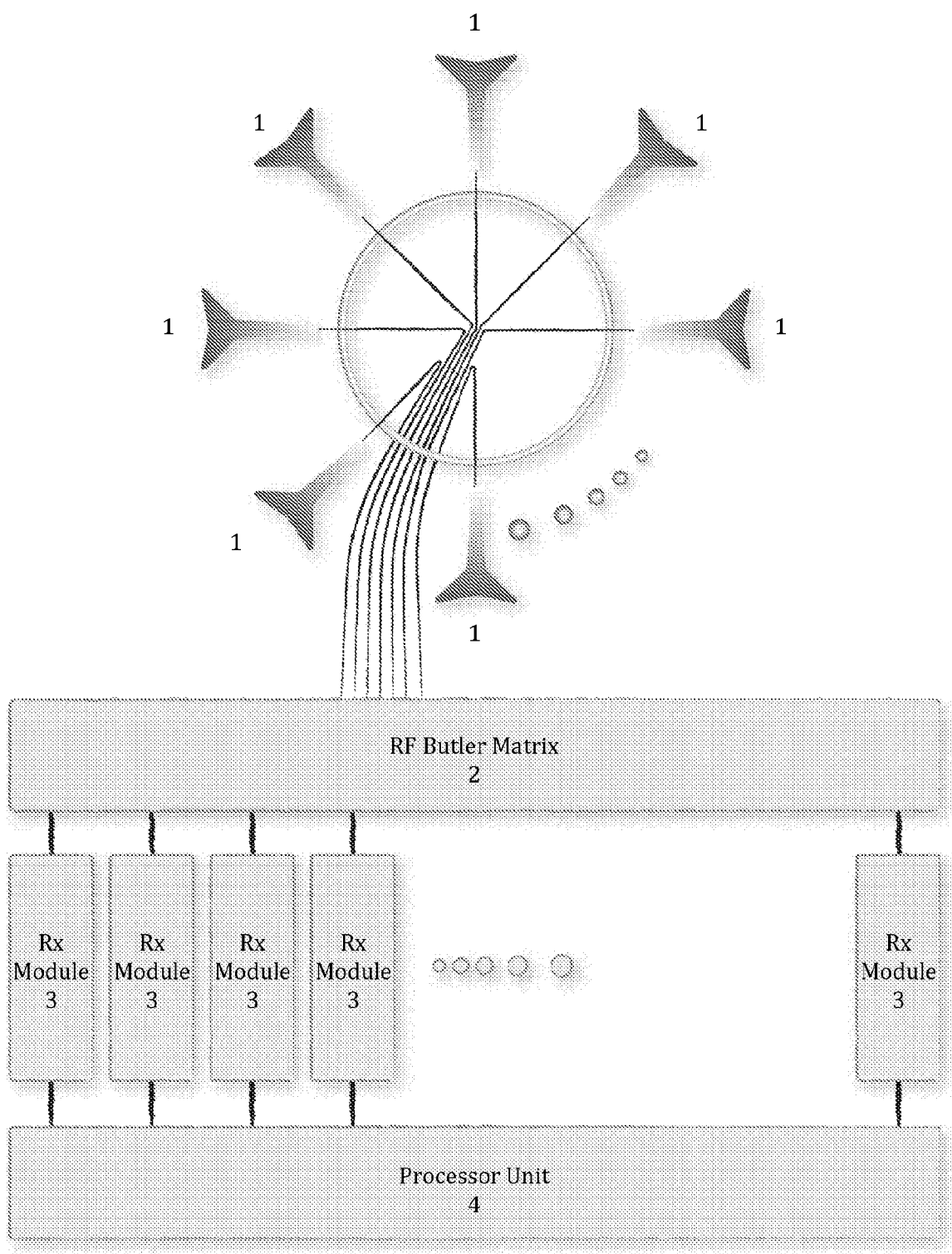
FIG. 1 shows an exemplary prior art of a direction-finding (DF) system implementing multimodal direction-of-arrival (DOA) technique to infer the bearing of an impinging received signal in azimuth incorporating passive radio frequency (RF) Butler matrix.
Figure 2:
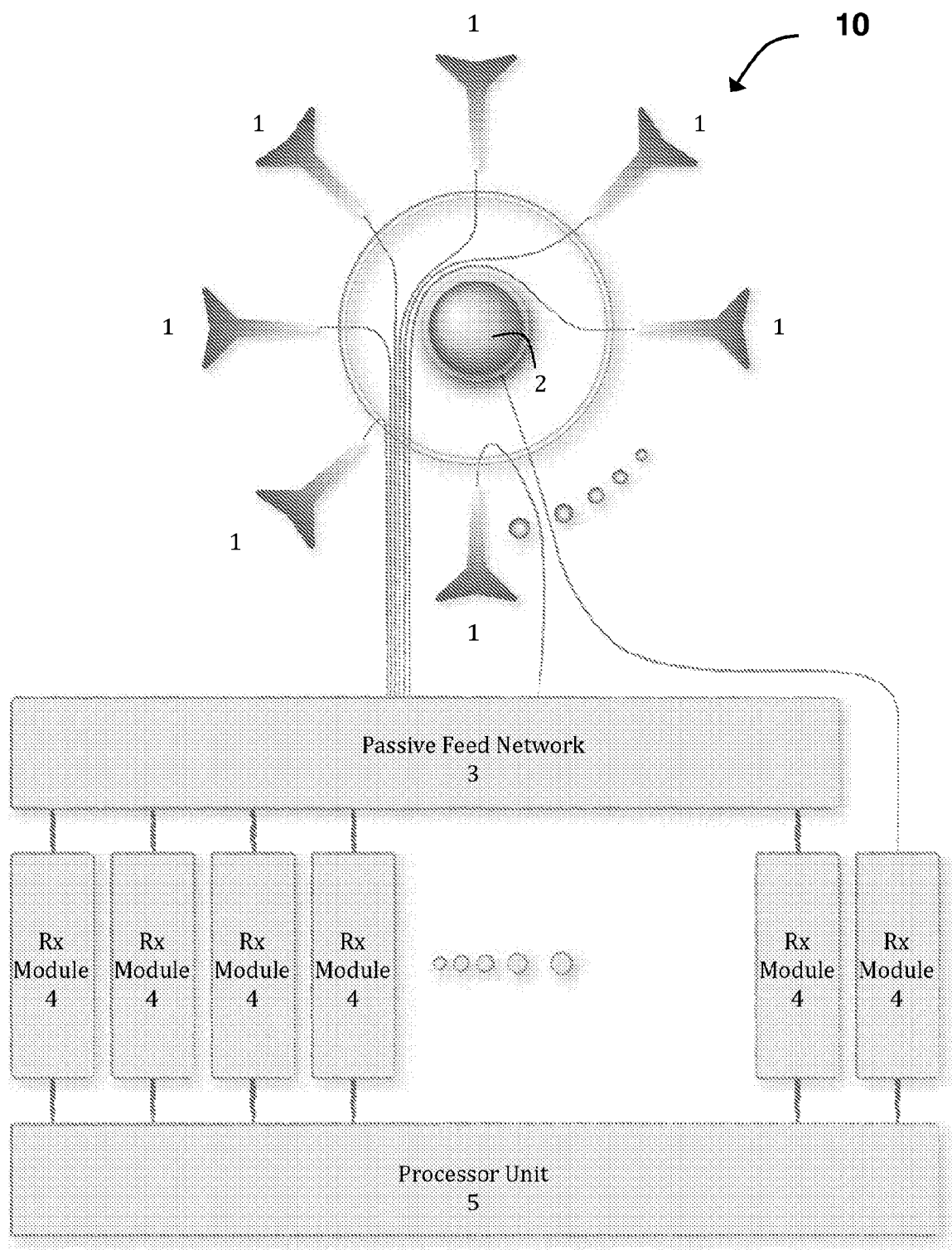
FIG. 2 shows an exemplary prior art of a DF system implementing multimodal and interferometer DOA techniques to infer the bearing of an impinging received signal both in azimuth and elevation.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without limiting the scope of the present invention.

A radar system and method for inferring the direction-of-arrival (DOA) of reflected signals covering 0° to 360° in azimuth within a predefined range of elevations below and above the horizon by incorporating the multimodal and interferometer direction-finding (DF) techniques in the digital domain. The radar antenna system may include a first omnidirectional antenna and a second omnidirectional antenna, which is located coaxially above or below the first omnidirectional antenna and separated therefrom at a predefined distance. Each of the elements of the first omnidirectional antenna and the second omnidirectional antenna may be configured to transmit and receive radio frequency (RF) signals by connection to a respective Receive and/or Transmit (Rx/Tx) module. Each of the Rx/Tx modules allows excitation of microwave signals in each respective antenna element resulting in radiated energy at predefined direction where each of the Rx/Tx modules may also be excited simultaneously with any other of the Rx/Tx modules thereby excite several antenna elements so as to steer the radiated energy into one or several predefined directions. The energy reflected off an object is received by the antenna elements and the Rx/Tx modules downconvert the received RF signal to an intermediate frequency (IF) signal, preferably by mixing with a local oscillator signal. Each one of the IF signals is digitized by the analog-to-digital convertors preferably located on the Digital Signal Processing Card (DSPC). The digitized IF signals received at the first omnidirectional antenna are digitally processed so as to form modal beams with opposite phase slope by digitally complex weighting and summation of each digitized IF signal so as to form two output signals. The digitized IF signal received at the second omnidirectional antenna is digitally processed as to form a reference signal of phase reference. The DSPC allows the extraction of first phase difference between the phase of the first signal and the reference phase, and a second phase difference between the phase of the second signal and the reference phase. Each phase difference includes a first component proportional to the azimuth of the arriving signal and a second component corresponding to the elevation of the arriving signal, from which the azimuth and the elevation of the arriving signal can be extracted.

The present invention, according to some embodiments thereof, relates to radar systems and more particularly to methods for inferring the direction-of-arrival (DOA) in azimuth and elevation of impinging reflected signals in radar systems with circular antenna arrays comprising a first omnidirectional antenna and a second omnidirectional antenna, which is located coaxially above or below the first omnidirectional antenna and separated therefrom at a predefined distance D.

According to some embodiments of the invention, there is provided a radar system covering azimuth from 0° to 360° within a predefined range of elevations below and above the horizon, comprising an antenna system for estimating the DOA, such as but not limited to, the antenna system described in U.S. Pat. No. 8,334,808, which is incorporated herein by reference as if fully disclosed herein. The range of elevations may be, for example, from −45° to 45° elevation below and above the horizon, respectively.

The antenna system may include a plurality of antenna elements configured to transmit and receive radio frequency (RF) signals. Each antenna element is directly connected to a respective one of the receive and/or transmit (Rx/Tx) modules.

Each of the Rx/Tx modules allows excitation of microwave signals in each respective antenna element resulting in radiated energy at predefined direction. Each of the Rx/Tx modules may also be excited simultaneously with any other of the Rx/Tx modules to thereby excite several antenna elements at one time, so as to steer the radiated energy into one or several predefined directions.

The energy reflected off an object is received by the elements and the Rx/Tx modules downconvert the received RF signal to an intermediate frequency (IF) signal, preferably by mixing with a LO signal, where the receiving channels are homodyne receivers of any implementation or heterodyne receivers of any implementation. Preferably, the Rx/Tx modules include signal conditioning elements such as amplifiers and/or filters and/or power-limiters and/or phase shifters and/or couplers et cetera.

The IF signals are processed so as to infer the bearing of the incoming RF signal. Each one of the IF signals is digitized in a respective analog-to-digital converter (ADC). The ADCs are preferably located on the DSPC but may also be located on the Rx/Tx module. In the latter case, the digitized data is fed into the DSPC. The digitized IF signals received at the first omnidirectional antenna are processed so as to form modal beams with opposite phase slope by complex weighting of each digitized input and summing the weighted digitized signals.

For example, for an equispaced array of N elements or feeds, the complex weights are given by:

$$w_{(i)} = e^{\pm j\frac{2\pi Mi}{N}}$$

where w(i) is the complex weight, $j=\sqrt{-1}$, M=(0, 1, 2 . . . ) is the phase slope, i is the module index and the (±) sign determines the slope direction, namely positive or negative.

In a case of modal beams of the first order with opposite phase slopes of (−1, +1), hence M=1, the positive modal beam is the sum:

$$S_{(+1)} = \frac{1}{\sqrt{N}} \sum_{i=0}^{N-1} s_i(T) e^{+j\frac{2\pi i}{N}}$$

and the negative modal beam of the first order is:

$$S_{(-1)} = \frac{1}{\sqrt{N}} \sum_{i=0}^{N-1} s_i(T) e^{-j\frac{2\pi i}{N}}$$

where $s_i(T)$ is the digitized received data from the first omnidirectional antenna.

The digitized IF signal received at the second omnidirectional antenna is processed so as to form a reference signal $S_{REF}$ of a reference phase such as having a phase-slope of zero.

The output signals of first omnidirectional antenna may be processed to include at least two of: first-order signal of a positive phase slope (+1), first-order signal of a negative phase slope (−1), second-order signal of a positive phase-slope (+2), and/or second-order signal of a negative phase-slope (−2), wherein at least two of the processed signals are of the same order and at least one of the processed signals is of the first order.

Figure 3:
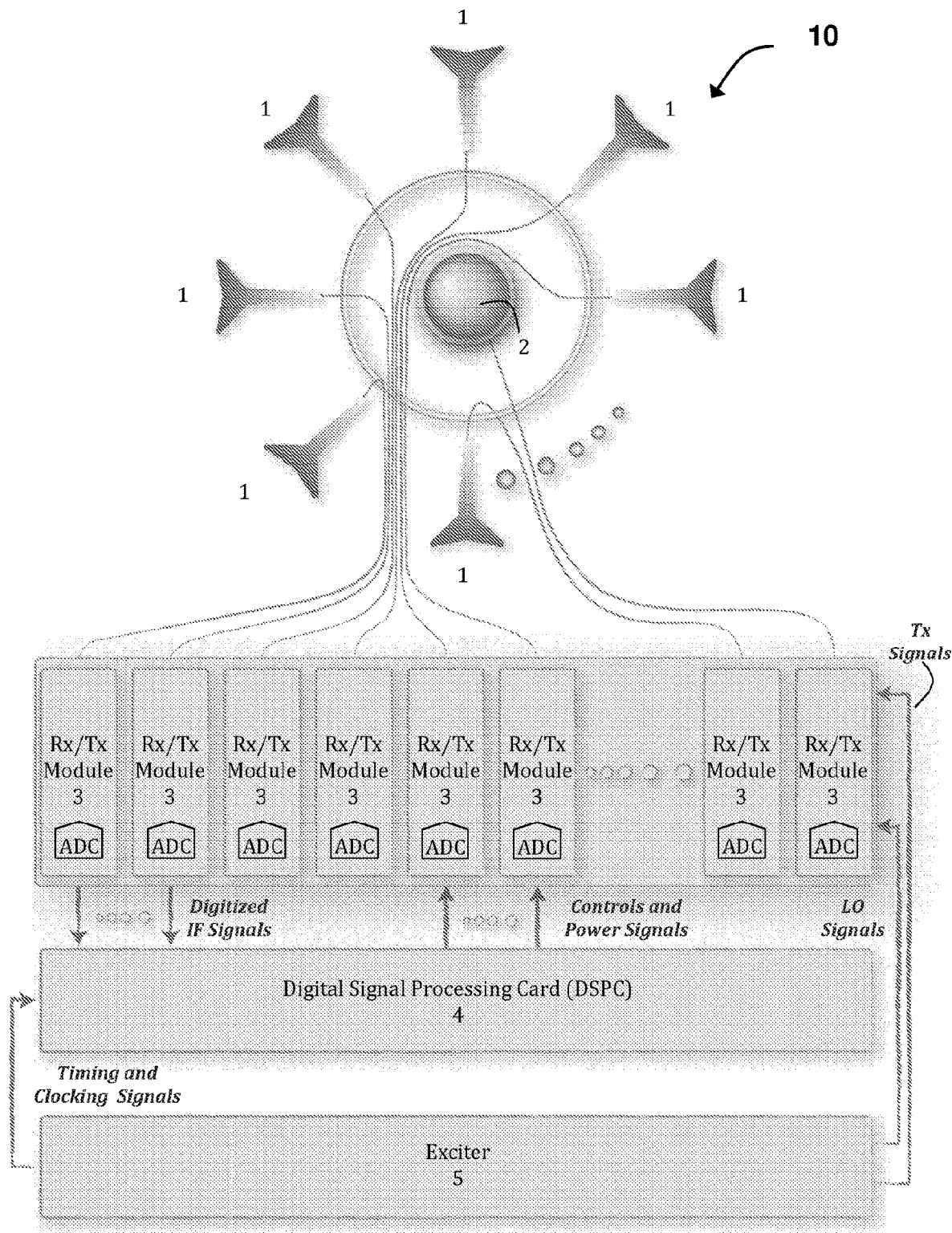
FIG. 3 shows a first embodiment of the present invention where the local-oscillator (LO) signals, transmit (Tx) signals and timing and clocking signals are generated in the exciter and the analog-to-digital convertors (ADCs) are located on the receive and/or transmit (Rx/Tx) module.
Figure 4:
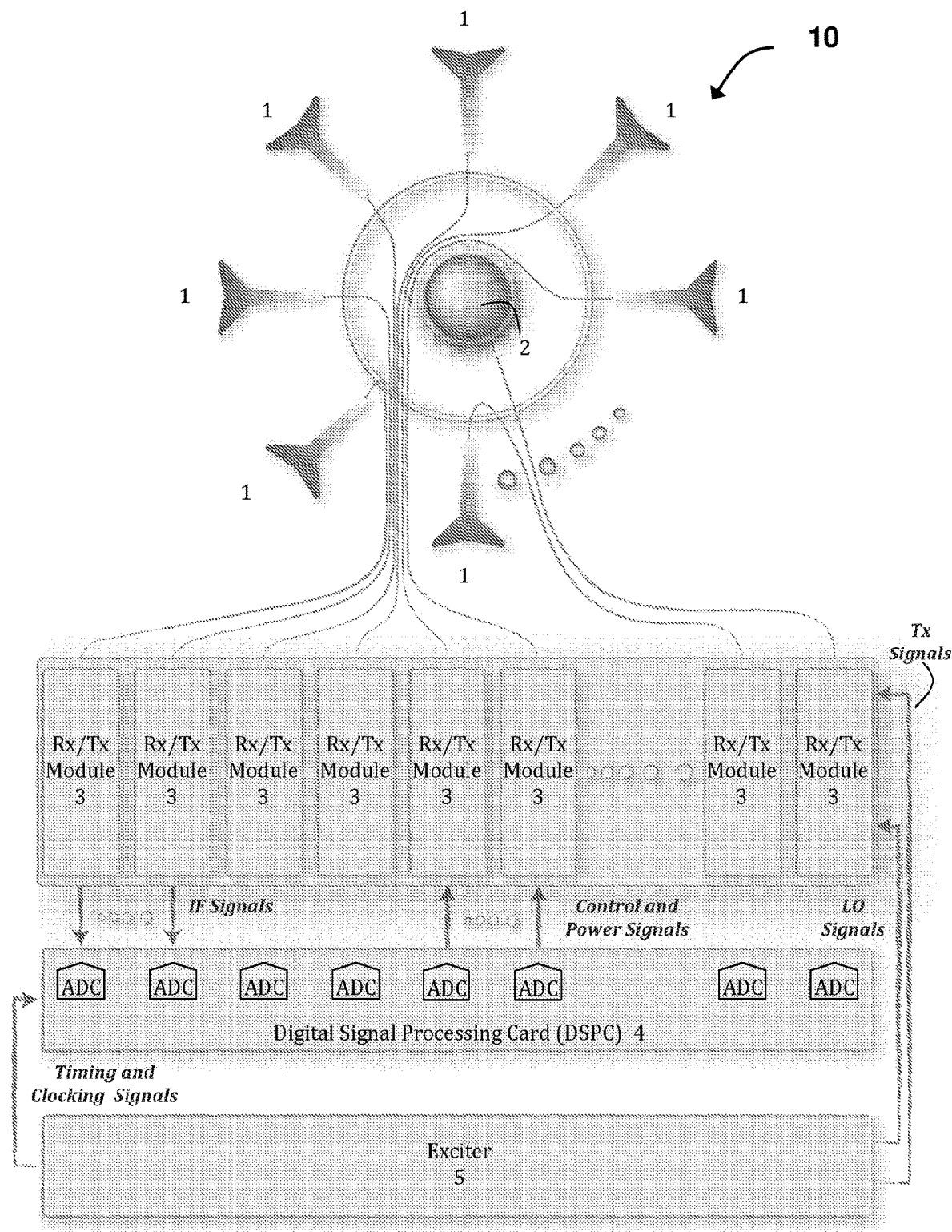
FIG. 4 shows a second embodiment of the present invention where the LO signals, Tx signals and timing and clocking signals are generated in the exciter and the ADCs are located on the digital-signal-processing card (DSPC) module.
Figure 5:
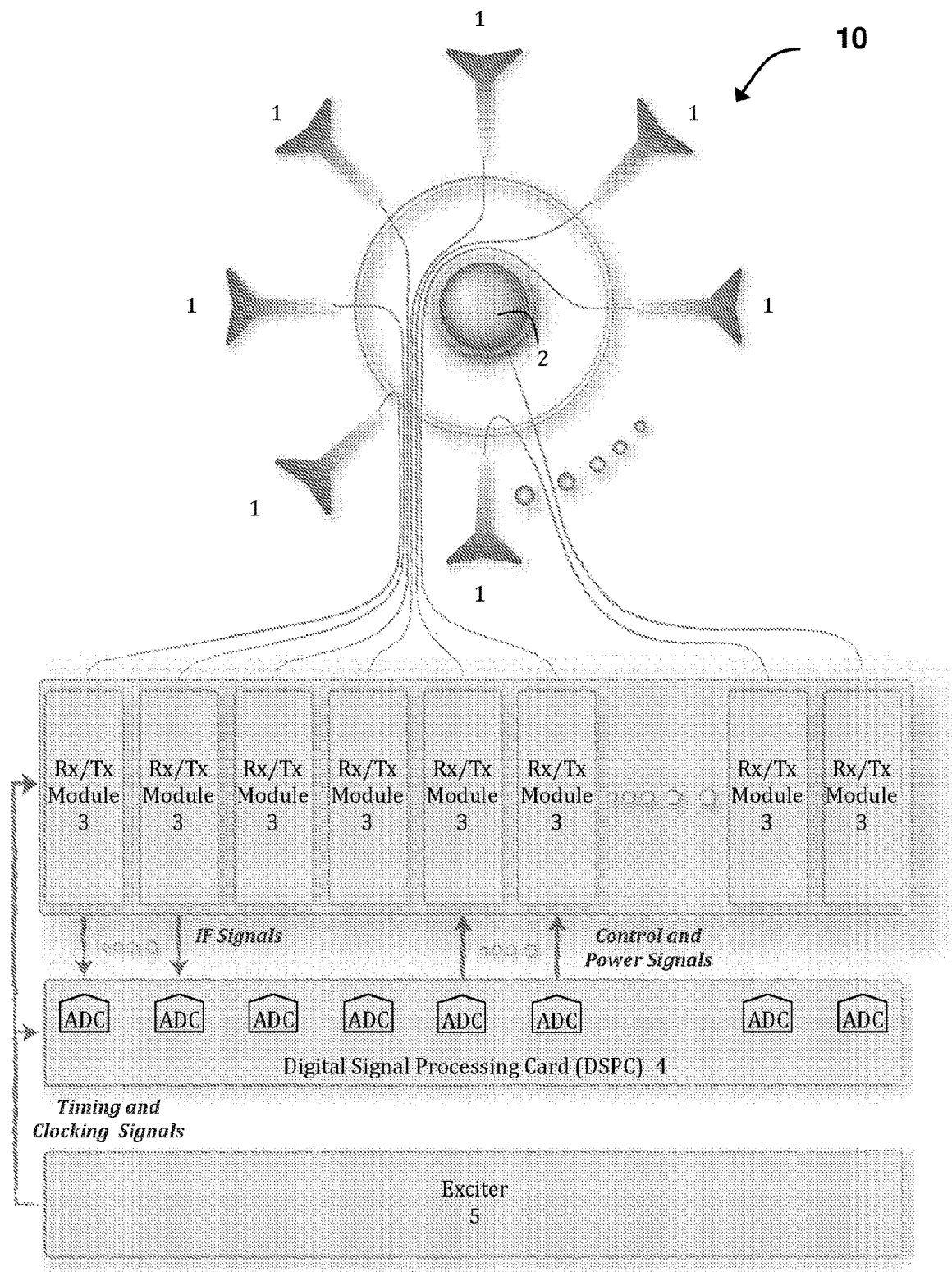
FIG. 5 shows a third embodiment of the present invention where the LO signals and Tx signals are generated locally on each Rx/Tx module.

Reference is now made to FIG. 3-5 which schematically illustrate embodiments of the radar system comprising an arbitrary number of elements 1 preferably but not necessarily equispaced around a circle or around a portion of a circle so as to form the first omnidirectional antenna 10. The system also includes a second omnidirectional antenna 2. The first omnidirectional antenna 10 and second omnidirectional antenna 2 may comprise a continuous multimodal and omnidirectional antenna or a discrete multimodal and omnidirectional antenna. In embodiments where the first omnidirectional antenna comprises a plurality of discrete multimodal antennas, the discrete multimodal antennas may form a circular antenna array, wherein at least a portion of elements in the plurality of discrete antenna elements comprises dipole, biconical dipole, monopole, conical monopole, patch, tapered slot-line, radial parallel, and/or horn antenna elements.

The second omnidirectional antenna may be one of: a dipole antenna, a biconical dipole antenna or a radial parallel-plate antenna wherein the plates may flare apart at some distance as in a biconical horn antenna. In the case where the second omnidirectional antenna is a dipole antenna or a biconical dipole antenna it may feed a coaxial transmission line or a balanced transmission line that directly connects the second omnidirectional antenna to an Rx/Tx module 3.

The Rx/Tx modules 3 allow the excitation of microwave signals in several ways. FIG. 3-4 illustrate embodiments where Tx signals are generated in the exciter module 5 and distributed to the Rx/Tx modules 3. FIG. 5 illustrates an embodiment where the Tx signals are generated locally on each individual Rx/Tx module 3. In this case, the clocking and timing signals are also provided into each Rx/Tx module 3.

The Rx/Tx modules 3 downconvert the received RF signal to an IF signal, preferably by mixing with a LO signal, where the receiving channels are homodyne receivers of any implementation or heterodyne receivers of any implementation. Each one of the IF signals is digitized by a respective one of the ADCs 104a (see, e.g., FIG. 9). FIG. 3 illustrates an embodiment where the digitizers (ADCs) are located on the Rx/Tx modules 3. FIG. 4-5 illustrate embodiments where the digitizers are located on the DSPC 4.

Figure 6:
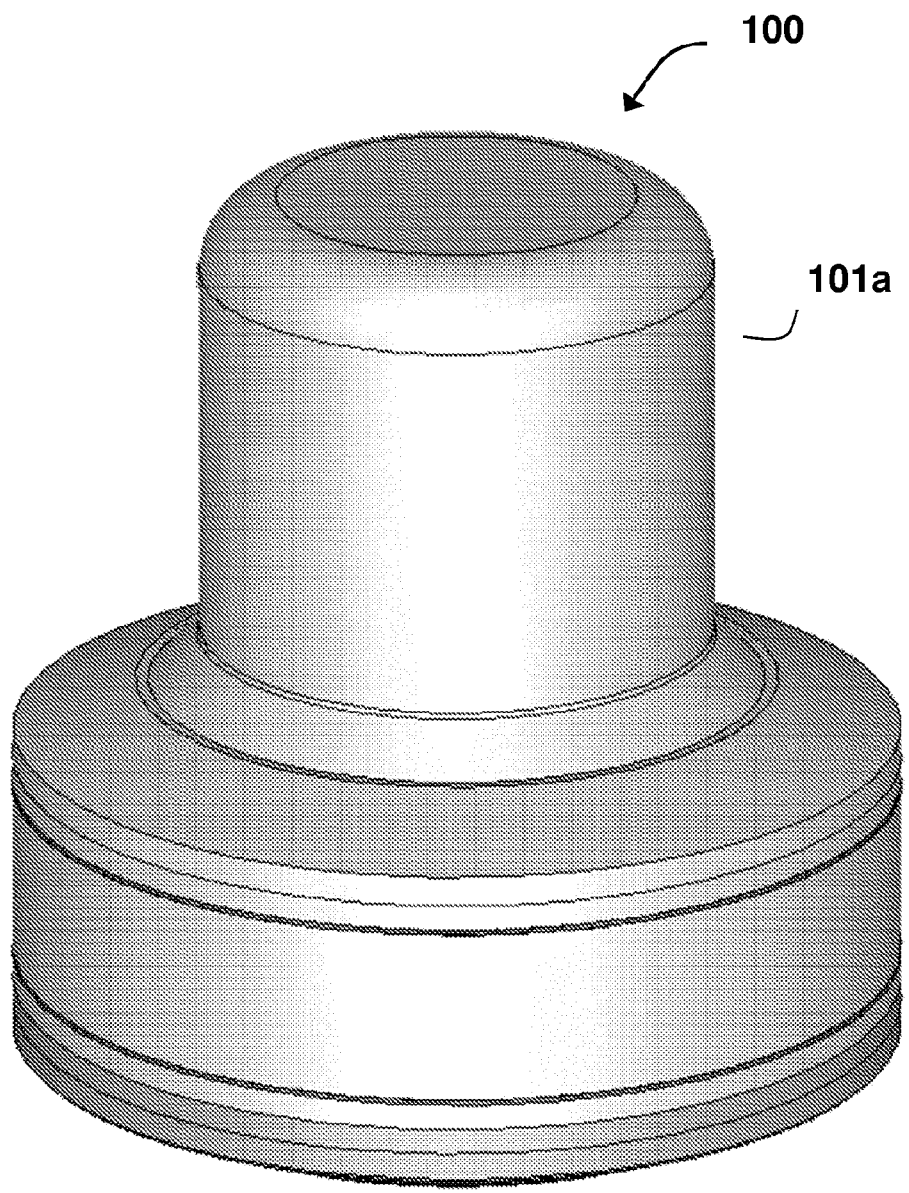
FIG. 6 shows one embodiment of the system where the radar is placed inside a radome.

Reference is now made to FIG. 6 which schematically illustrates, according to some embodiments of the invention, one embodiment of the radar system 100 and the antenna radome 101a.

Figure 7:
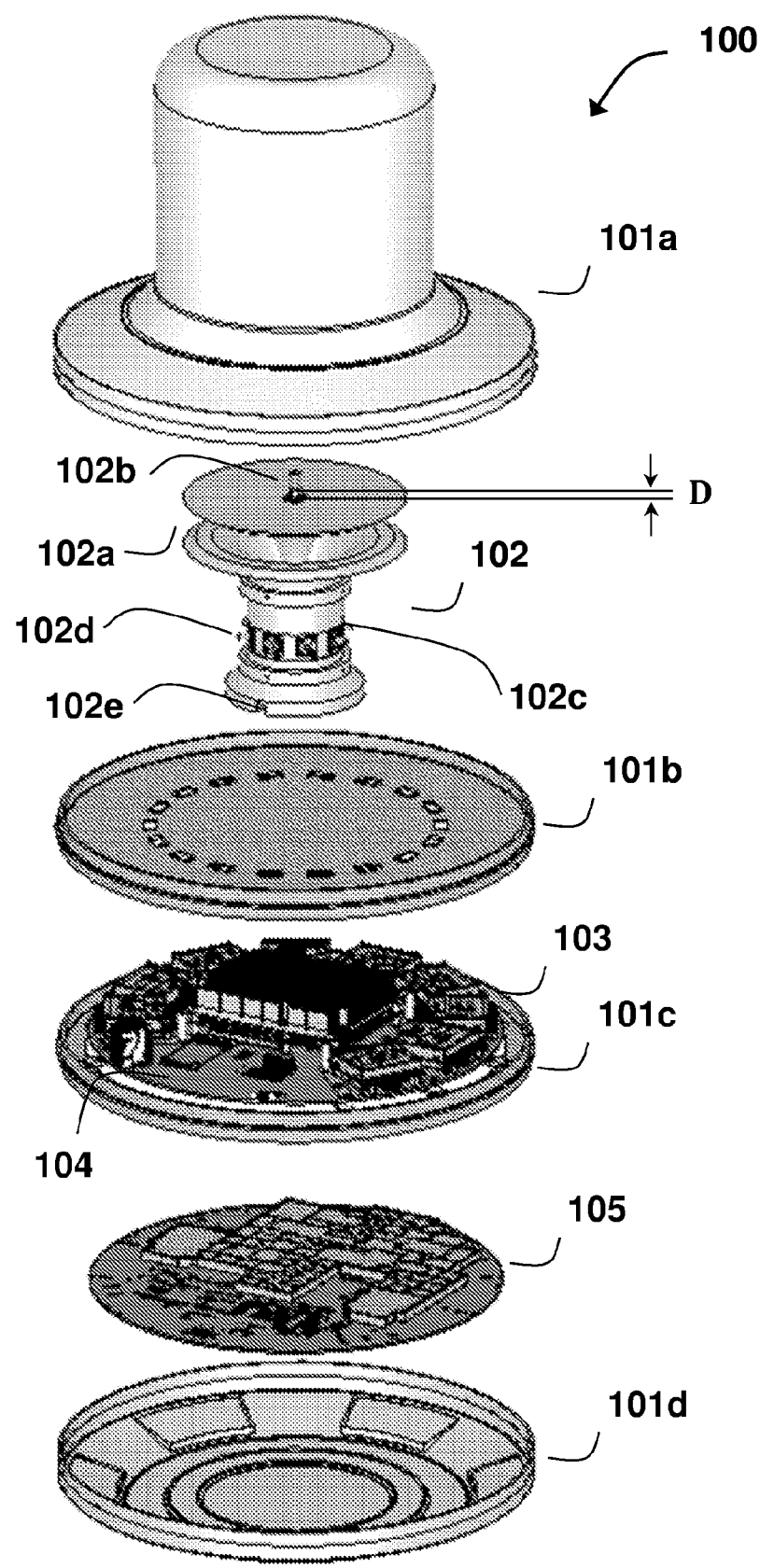
FIG. 7 shows the embodiment seen in FIG. 6 in exploded view.

Reference is now made to FIG. 7 which schematically illustrates, according to some embodiments of the invention, one embodiment of the radar system 100, in exploded view. Other configurations of the radar system 100 are possible. According to this embodiment of the invention, the antenna system 102 is located under the radome top cover 101a. The antenna system in this embodiment is a biconical horn antenna 102a and a monopole 102b located coaxially above it at a distance D. The distance D may be up to several λ where λ is the wavelength of the center operating frequency. The biconical horn 102a is fed by an overmoded circular coaxial waveguide (CWG) 102c and fed by feeds 102d located close to the bottom around the circumference. CWG 102e may be of dimensions corresponding to the operating frequency range. For a frequency range of wavelengths range $\lambda_{fmax} < \lambda < \lambda_{fmin}$, the CWG 102c is designed to allow the propagation of the $TE_{11}$ and $TE_{21}$ modes, hence the diameter of the outer circumference of CWG 102c may be of the dimensions of $d1 = \lambda_{fmin}$. The location of feeds 102d is set to about $\frac{1}{4}\lambda_{fmin}$. The monopole antenna 102b is fed by a coaxial transmission line 102e located at the bottom of the biconical horn antenna 102a.

The antenna system 102 is placed on top of a support plate 101b. The DSPC 104 in this embodiment is placed underneath the support plate. The Rx/Tx modules 103 are placed around the perimeter of the DSPC 104. The DSPC 104 is supported by support plate 101c preferably made of a heat conducting material such as aluminum. By that construction, not only does the support plate allow for good mechanical structure but it also allows for heat dissipation from the center of the DSPC 104 module towards the outer environment.

Also according to this exemplary embodiment, the exciter 105 is located underneath the DSPC 104 and the support plate 101c and is hooked to the bottom of the radome structure 101d. Other configurations are possible.

Figure 8:
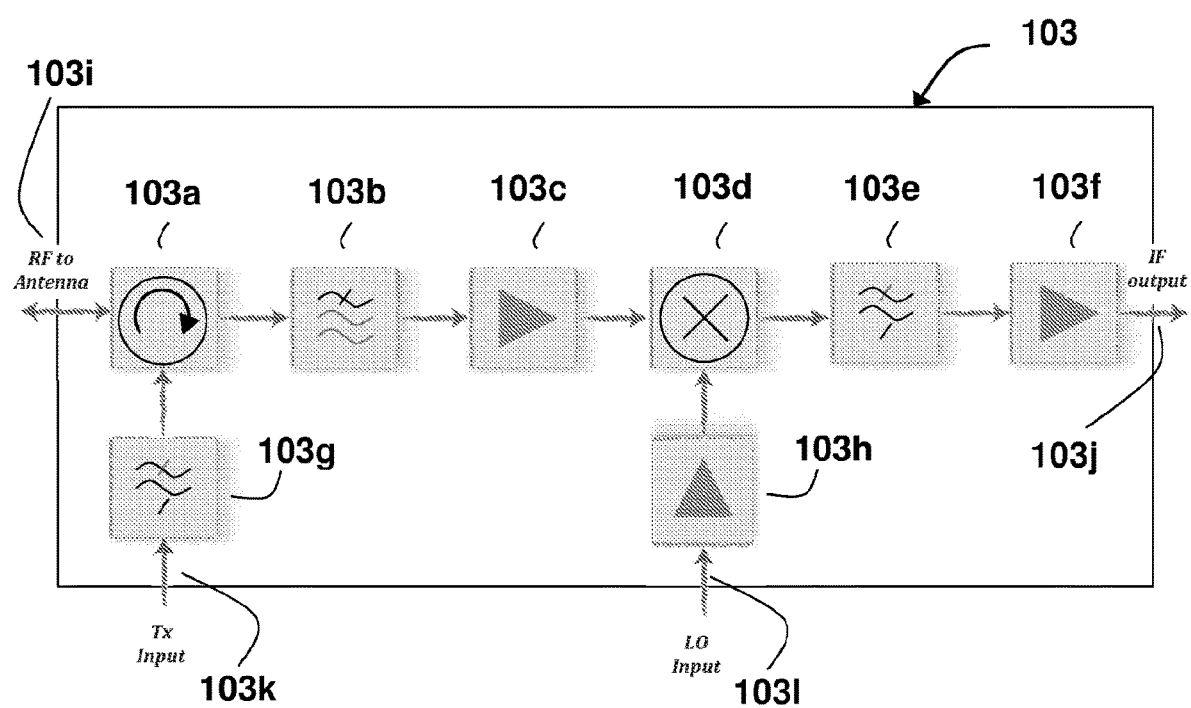
FIG. 8 shows, according to some embodiments of the invention, one embodiment of the Rx/Tx module according to the embodiment illustrated in FIG. 4.

Reference is now made to FIG. 8 which schematically illustrates, according to some embodiments of the invention, one embodiment an Rx/Tx module 103. Other configurations of the Rx/Tx module 103 are possible. Each Rx/Tx module is directly connected to one of the feeds of the first omnidirectional antenna or to the feed of the second omnidirectional antenna at the RF to antenna port 103i. The signal is passed through RF circulator 103a which directs the received signal toward the first RF filter 103b or directs the Tx signal excited at the Tx input port 103k and filtered with RF Tx filter 103g toward the antenna. The received signal is then amplified by RF amplifier 103c and downconverted into an IF signal at the RF-to-IF mixer 103d. The mixing is done with LO signal excited at LO input port 103l and amplified with LO RF amplifier 103h. The IF signal at the output of RF-to-IF mixer 103d is filtered with IF filter 103e so to reject LO leakages and amplified with IF amplifier 103f. The IF amplifier 103e output is connected to the IF output port 103j.

Figure 9:
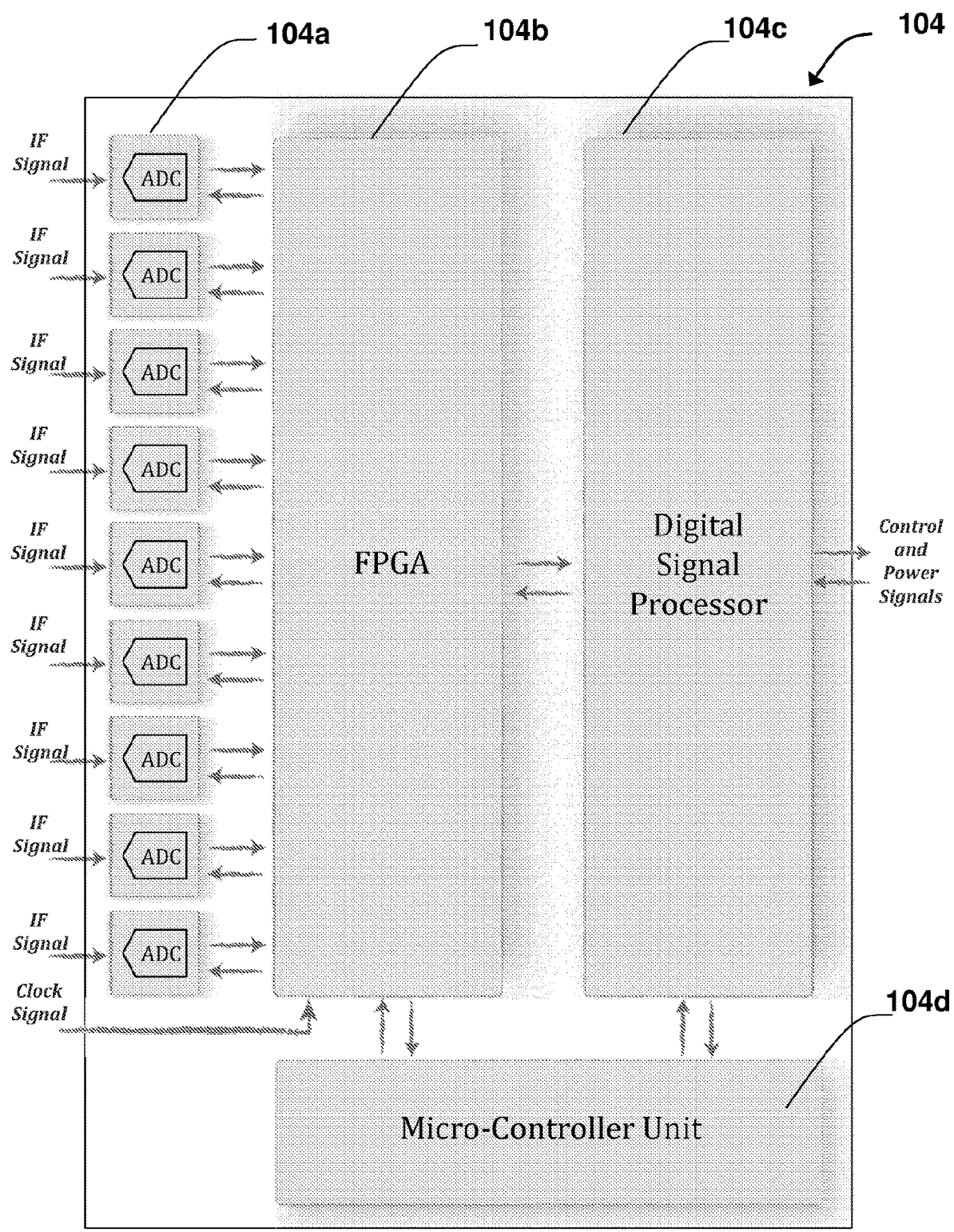
FIG. 9 shows, according to some embodiments of the invention, one embodiment of the DSPC module according to the embodiment illustrated in FIG. 4.

Reference is now made to FIG. 9 which schematically illustrates, according to some embodiments of the invention, one embodiment of the DSPC 104. Other configurations of the DSPC 104 are possible. The DSPC 104 is the computational and control unit of the system and according to this embodiment, the IF output of each Rx/Tx module is directly connected to an ADC 104a located on the DSPC 104. The ADC 104a outputs are connected to the programmable logic component field-programmable gate array (FPGA) 104b. The FPGA 104b multiplies each digital IF signal originally received by the first omnidirectional antenna with the appropriate complex weight (as described above) so as to digitally obtain the modal beams of the desired order and phase slopes. The digitized IF signal received by the second omnidirectional antenna is time-delayed so as to compensate for the time consumed by the complex multiplication process of the digitized IF signal received by the first omnidirectional antenna so as to transform the digitized IF signal received by the second omnidirectional antenna into a reference signal. The output signals of the desired modal order and phase slopes and the output reference signal are transferred from the FPGA 104b into the digital-signal-processor (DSP) 104c for further processing and radar calculations. The DSPC 104 further comprise a microcontroller unit (MCU) 104d that monitors voltages and temperature of the DSPC 104.

Figure 10:
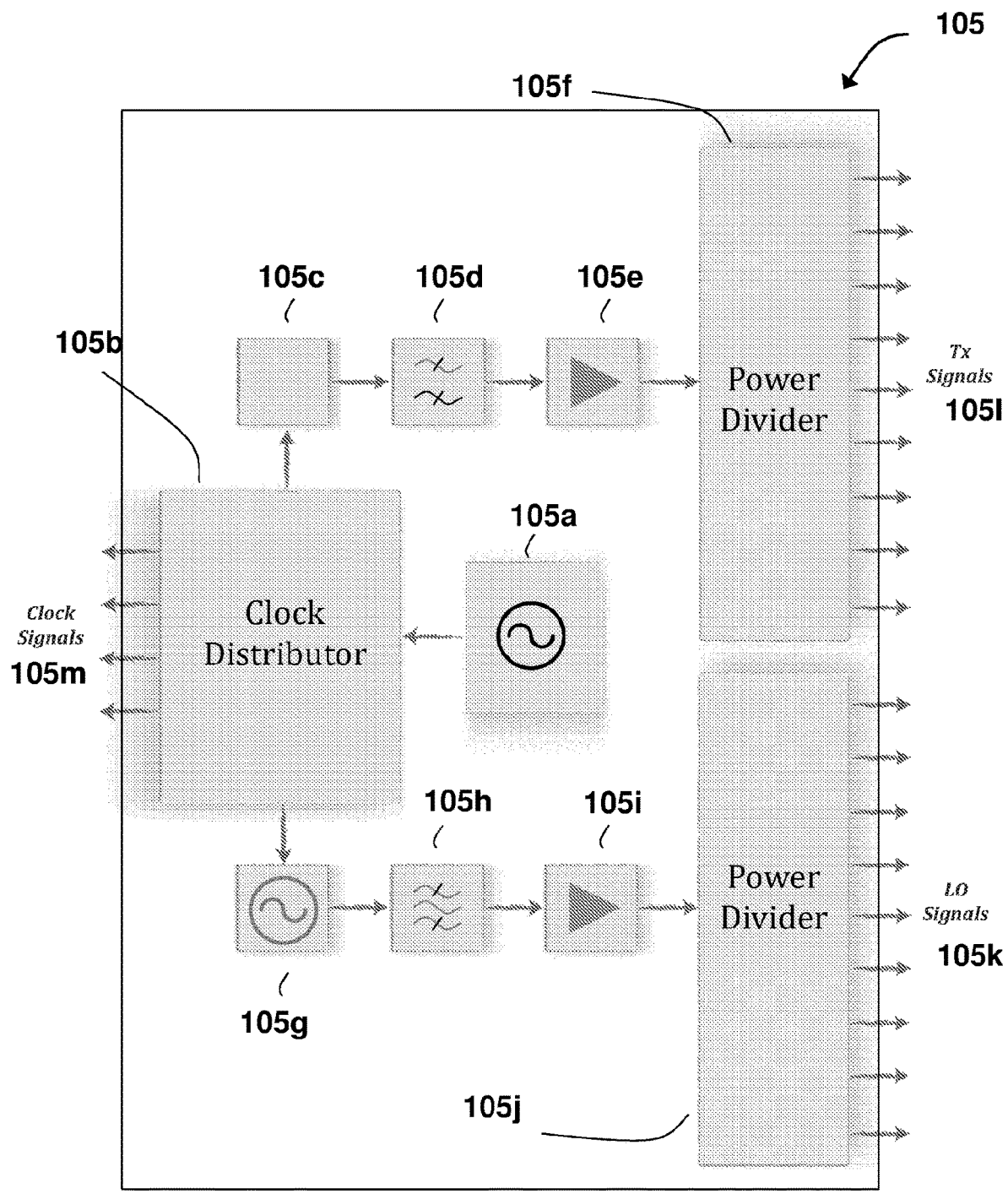
FIG. 10 shows, according to some embodiments of the invention, one embodiment of the exciter module according to the embodiment illustrated in FIG. 4.

Reference is now made to FIG. 10 which schematically illustrates, according to some embodiments of the invention, one embodiment of the exciter module 105. Other configurations of the exciter module 105 are possible. According to this embodiment, the exciter module 105 generate the clock signals in the system and generates the Tx and LO signals. The exciter comprises a master oscillator 105a connected to a clock distributor module 105b. Some of the outputs 105m of the clock distributor module 105b are distributed to other consumers in the system, that is, the Rx/Tx modules, and the DSPC. Some of the outputs are connected to the Tx chain synthesizer module 105c and to the LO chain synthesizer module 105g. The output of the Tx chain synthesizer module 105c is filtered by RF Tx filter 105d so as to filter unwanted signals that may be present at the output of the Tx chain synthesizer module 105c. The filtered signal out of RF Tx filter 105d is amplified by RF amplifier 105e and directed toward RF Tx power divider 105f. The output ports 105i of the RF Tx power divider 105f are connected directly to each Rx/Tx module. The output of the LO chain synthesizer module 105g is filtered by RF LO filter 105h so as to filter unwanted signals that may be present at the output of the Tx chain synthesizer module 105g. The filtered signal out of RF LO filter 105h is amplified by RF amplifier 105i and directed toward RF LO power divider 105j. The output ports 105k of the RF/Tx power divider 105j are connected directly to each Rx/Tx module.

Figure 11:
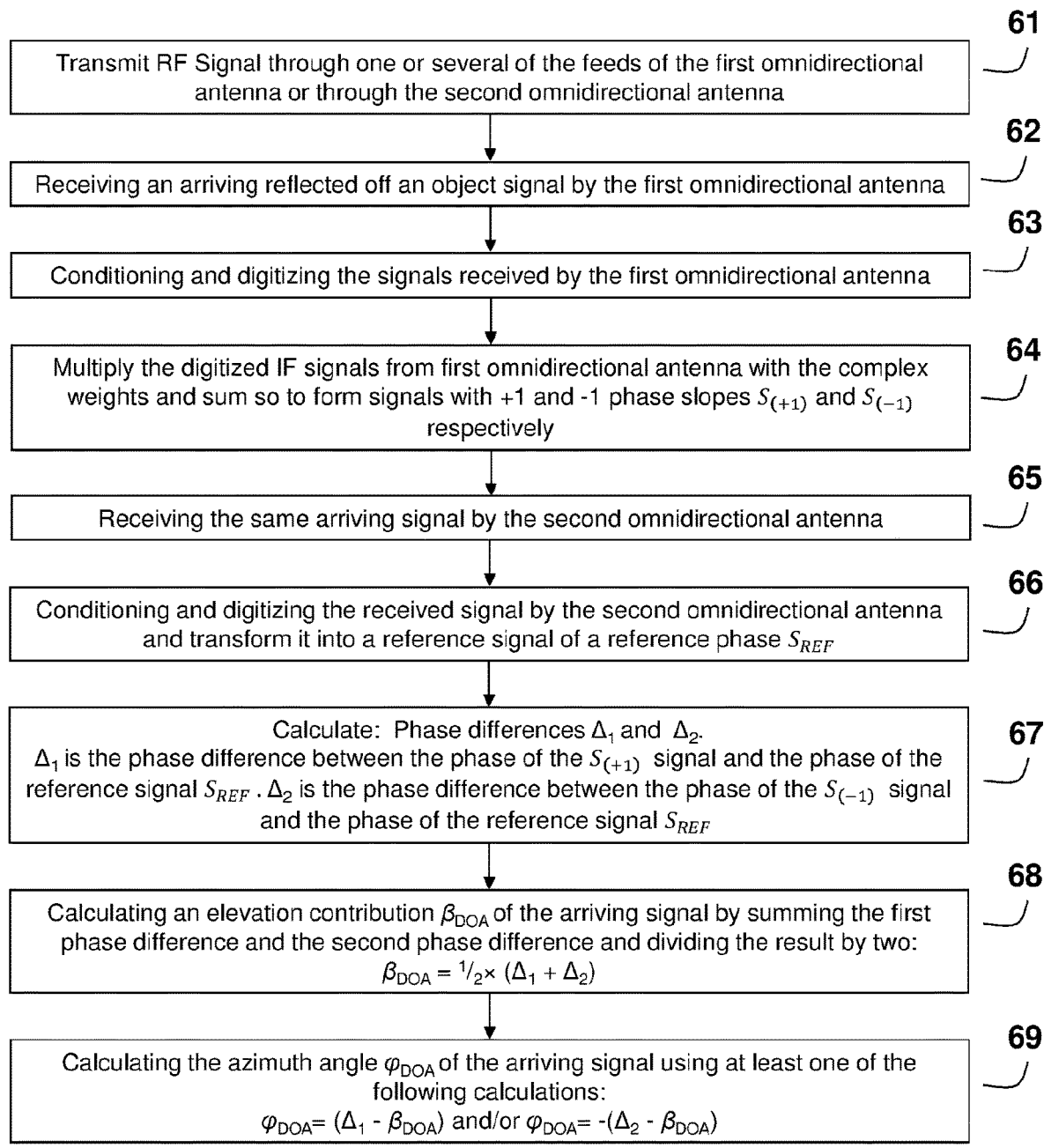
FIG. 11 shows a method for implementing multimodal and interferometer DOA techniques to infer the bearing of an impinging received signal in azimuth and elevation where the modal beams are formed and processed in the digital domain according to some embodiments of the invention.

Reference is now made to FIG. 11 which schematically illustrates a method for implementing multimodal and interferometer DOA techniques to infer the bearing of an impinging received signal in azimuth and elevation where the modal beams are formed and processed in radar systems in the digital domain, according to some embodiments of the invention. The method may be fitted for a radar system comprising a first omnidirectional antenna and a second omnidirectional antenna such as is described above with respect to FIGS. 3-10, where the DSPC processes the digitized IF signals so as to produce first-order output signals of opposite phase slopes (+1) and (−1). The method may comprise the following steps. At step 61, an RF signal is transmitted, through one or several of the feeds connected to the first omnidirectional antenna or through the second omnidirectional antenna feed. At step 62, an arriving reflected-off an object signal is received, by the first omnidirectional antenna. At step 63, the signals received by the first omnidirectional antenna 62 are conditioned and digitized by the respective ADCs. The digitizing of the signal preferably but not necessarily is performed following amplification and/or filtering. At step 64, the digitized IF signals from first omnidirectional antenna are multiplied with the complex weights. The complex weighted signals are summed so to form signals with +1 and −1 phase slopes $S_{(+1)}$ and $S_{(-x)}$ respectively. At step 65, the same arriving reflected off an object signal is received the second omnidirectional antenna. At step 66, the signals received by the second omnidirectional antenna are conditioned and digitized by the respective ADC. The digitizing of the signal preferably but not necessarily is performed following amplification and/or filtering so as to transform it into a reference signal of phase reference $S_{REF}$. At step 67 $\Delta_1$ and $\Delta_2$ are calculated, wherein $\Delta_1$ is the phase difference between the phase of the $S_{(+1)}$ signal and the reference phase and $\Delta_2$ is the phase difference between the phase of the $S_{(-1)}$ signal and the reference phase. The phase differences $\Delta_1$ and $\Delta_2$ are calculated by simple algebraic operations:

$$\Delta_1 = \arg(S_{(+1)}) - \arg(S_{REF})$$

$$\Delta_2 = \arg(S_{(-1)}) - \arg(S_{REF})$$

The first phase difference $\Delta_1$ is proportional to $(\varphi+\beta)$ wherein $\varphi$ is proportional to the azimuth of the arriving signal and $\beta$ is the elevation contribution of the arriving signal, which corresponds to the elevation angle and the distance between the first omnidirectional antenna and the second omnidirectional antenna. The second phase difference $\Delta_2$ is proportional to $(-\varphi+\beta)$. At step 68, the elevation contribution $\beta_{DOA}$ is calculated, wherein the elevation contribution is extracted by summing the first phase difference and the second phase difference and dividing the result by two:

$$\beta_{DOA} = \frac{1}{2} \times (\Delta_1 + \Delta_2)$$

where $\beta_{DOA}$ corresponds to the elevation $\alpha$ according to $$\frac{2\pi D}{\lambda} \sin(\alpha)$$

where $\lambda$ is the wavelength of the arriving signal. At step 69, the azimuth angle $\varphi_{DOA}$ are calculated, wherein calculating the azimuth angle is extracted by using at least one of the calculations of:

$$\varphi_{DOA} = (\Delta_1 - \beta_{DOA})$$

and/or $$\varphi_{DOA} = -(\Delta_2 - \beta_{DOA});$$

Figure 12:
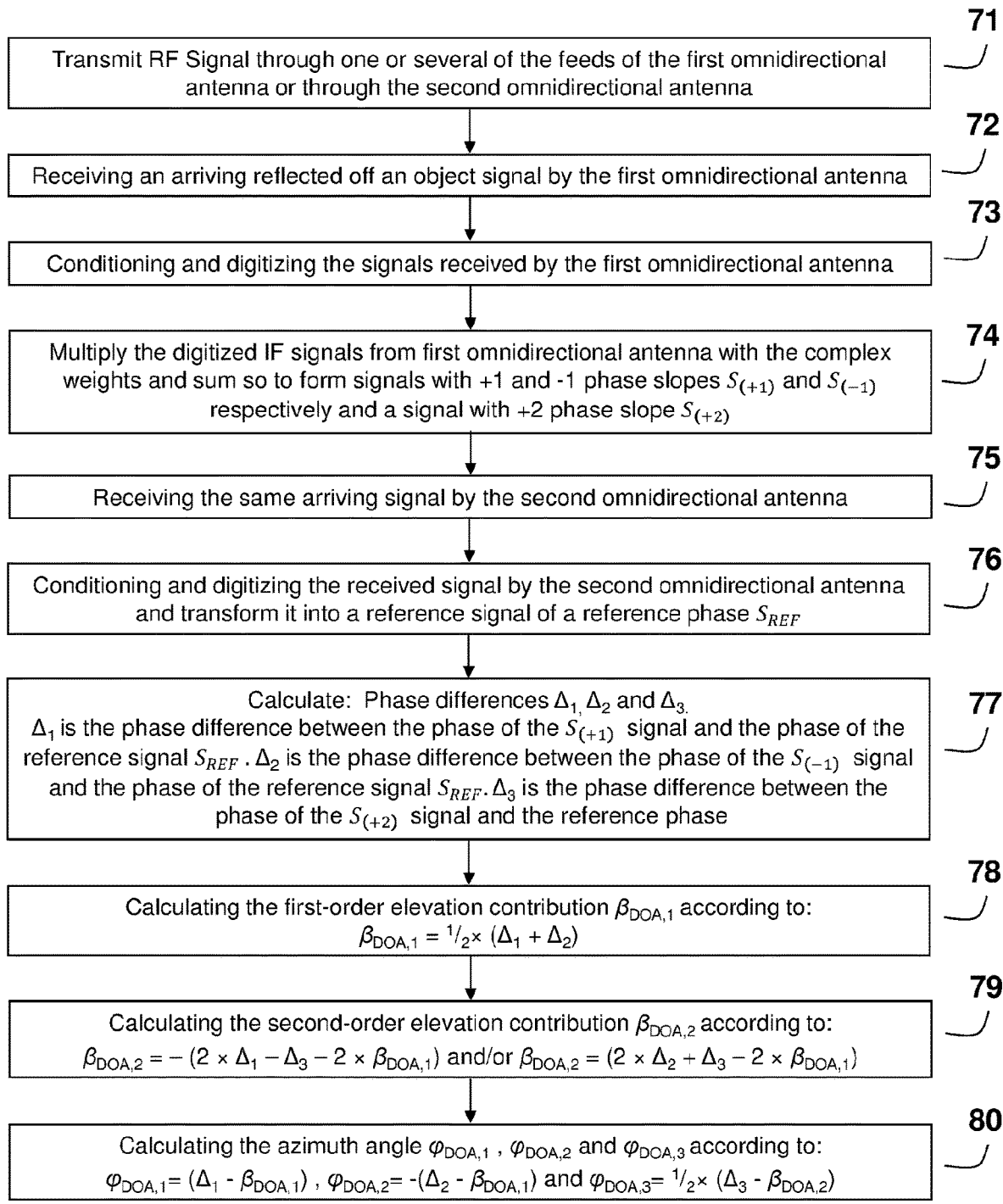
FIG. 12 shows a method for implementing multimodal and interferometer DOA techniques to infer the bearing of an impinging received signal in azimuth and elevation where the modal beams are formed and processed in the digital domain according to other embodiments of the invention.

Reference is now made to FIG. 12, which schematically illustrates a method for implementing multimodal and interferometer DOA techniques to infer the bearing of an impinging received signal in azimuth and elevation where the modal beams are formed and processed in radar systems in the digital domain, according to some embodiments of the invention. The method may be fitted for a radar system comprising a first omnidirectional antenna and a second omnidirectional antenna, where the DSPC processes the digitized IF signals so as to produce first-order output signals of opposite phase slopes (+1) and (−1) and a second-order output signal (+2). The method may comprise, at step 71, transmitting an RF signal through one or several of the feeds connected to first omnidirectional antenna or through second omnidirectional feed. At step 72, an arriving reflected off an object signal is received by the first omnidirectional antenna. At step 73, the signals received by the first omnidirectional antenna are conditioned and digitized by the ADCs. The digitizing of the signal preferably but not necessarily is performed following amplification and/or filtering. At step 74, the digitized IF signals from first omnidirectional antenna are multiplied with the complex weights. The complex weighted signals are summed so to form signals with +1 and −1 phase slopes $S_{(+1)}$ and $S_{(-1)}$ respectively and a signal with +2 phase slope $S_{(+2)}$. At step 75, the same arriving reflected off an object signal is received by the second omnidirectional antenna. At step 76, the signals received by the second omnidirectional antenna are conditioned and digitized by the ADCs. The digitizing of the signal preferably but not necessarily is performed following amplification and/or filtering so as to transform the signals into reference signals of phase reference $S_{REF}$. At step 77, $\Delta_1$, $\Delta_2$ and $\Delta_3$ are calculated, wherein $\Delta_1$ is the phase difference between the phase of the $S_{(+1)}$ signal and the reference phase, $\Delta_2$ is the phase difference between the phase of the $S_{(-1)}$ signal and the reference phase and $\Delta_3$ is the phase difference between the phase of the $S_{(+2)}$ signal and the reference phase. The phase differences $\Delta_1$, $\Delta_2$ and $\Delta_3$ are calculated by simple algebraic operations:

$$\Delta_1 = \arg(S_{(+1)}) - \arg(S_{REF})$$

$$\Delta_2 = \arg(S_{(-1)}) - \arg(S_{REF})$$

$$\Delta_3 = \arg(S_{(+2)}) - \arg(S_{REF})$$

The first phase difference $\Delta_1$ is proportional to $(\varphi + \beta_1)$ wherein $\varphi$ is proportional to the azimuth of the arriving signal and $\beta$ is the elevation contribution of the arriving signal, which corresponds to the elevation angle and the distance between first omnidirectional antenna and second omnidirectional antenna. The second phase difference $\Delta_2$ is proportional to $(-\varphi + \beta_1)$ and the third phase difference $\Delta_3$ is proportional to $(2\varphi + \beta_2)$ where $\beta_2$ is second-order elevation contribution. At step 78, the first-order elevation contribution $\beta_{DOA,1}$ is calculated, wherein the first-order elevation contribution is extracted by summing the first phase difference and the second phase difference and dividing the result by two:

$$\beta_{DOA,1} = \tfrac{1}{2} \times (\Delta_1 + \Delta_2).$$

The second-order elevation contribution $\beta_{DOA,2}$ is then calculated according to $$\beta_{DOA,2} = -(2 \times \Delta_1 - \Delta_3 - 2 \times \beta_{DOA,1})$$

and/or $$\beta_{DOA,2} = (2 \times \Delta_2 + \Delta_3 - 2 \times \beta_{DOA,1}) \quad 79;$$

The azimuth angles $\varphi_{DOA,1}$, $\varphi_{DOA,2}$ and $\varphi_{DOA,3}$ are calculated according to:

$$\varphi_{DOA,1} = (\Delta_1 - \beta_{DOA,1}), \varphi_{DOA,2} = -(\Delta_2 - \beta_{DOA,1})$$

and $$\varphi_{DOA,3} = \tfrac{1}{2} \times (\Delta_3 - \beta_{DOA,2}).$$

The DSPC enables the calculation of any modal order required to infer the DOA according to combined multimodal and interferometry techniques namely, at least two signals of the same modal order with opposite phase slope and at least one of the first order.

Many alterations and modifications may be made by those having ordinary skill in the art without departing from the spirit and scope of the invention. Therefore, it must be understood that the illustrated embodiments have been set forth only for the purposes of example and that should not be taken as limiting the invention as defined by the following claimed invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A radar system for inferring direction-of-arrival (DOA) of reflected signals covering 360° azimuth within a predefined range of elevations below and above the horizon to detect, identify and track a target by incorporating multimodal and interferometer direction-finding (DF) techniques, the radar system comprising:
    an antenna system for transmitting and receiving radio frequency (RF) signals, the antenna system comprising:
    a plurality of antenna elements configured so as to transmit and receive radio frequency (RF) signals, the antenna elements comprising a first omnidirectional antenna configured to form a circular array;
    a plurality of receiving and/or transmitting (Rx/Tx) modules connected to respective ones of the plurality of antenna elements to transmit and receive the RF signals to and from the plurality of antenna elements;
    a digital signal processing unit (DSPC) operably connected to the plurality of Rx/Tx modules and configured and operable to process received RF signals to infer the direction-of-arrival (DOA) of reflected signals covering 360° azimuth within the predefined range of elevations below and above the horizon to detect, identify and track the target, the DSPC comprising a plurality of analog-to-digital converters (ADCs), each ADC being connected to receive a signal from a corresponding one of the Rx/Tx modules to convert an analog RF signal received from a corresponding one of the antenna elements to a digital signal, and a programmable logic component field-programmable gate array (FPGA) connected to an output of the ADCs for receiving digital signals from the ADCs and multiplying each digital signal received from the omnidirectional antenna by an appropriate complex weight to generate a first signal and a second signal with opposite phase slope wherein the phases of the first and second signals are proportional to an azimuth angle of the arriving signal; and an exciter module operably connected to the DSPC and configured and operable to generate and distribute timing signals to the DSPC, the Rx/Tx modules and the plurality of antenna elements, wherein each of the Rx/Tx modules allows excitation of microwave signals in each respective antenna element, alone or simultaneously with any other Rx/Tx modules, to thereby excite one or more antenna elements so as to steer the radiated energy into one or more predefined directions.

2. The radar system according to claim 1, wherein each of the Rx/Tx modules is operatively and directly connected to the respective one of the plurality of antenna elements.

3. The radar system according to claim 1, wherein the Rx/Tx module allows excitation of microwave signals resulting in radiated energy at 0°-360° azimuthal direction.

4. The radar system according to claim 1, wherein the Rx/Tx modules further convert a received RF signal into an intermediate frequency (IF) signal, by mixing the received RF signal with a local oscillator (LO) signal.

5. The radar system according to claim 1, wherein the DSPC is configured and operable to process the intermediate frequency (IF) signal so as to infer the azimuth and elevation of an incoming RF signal.

6. The radar system according to claim 1, wherein the antenna system further comprises a second omnidirectional antenna, which is located coaxially about a predefined vertical axis in relation to the first omnidirectional antenna and separated therefrom at a predefined vertical distance.

7. The radar system according to claim 1, further comprising analog-to-digital converters located on the DSPC or on the Rx/Tx modules.

8. The radar system according to claim 1, wherein each of the Rx/Tx modules comprises:
an RF circulator connected to receive an RF signal from a corresponding one of the antenna elements and a Tx signal excited at a Tx input port of the Rx/Tx module and filtered by an RF Tx filter and output the received RF signal and the filtered Tx signal;
an RF amplifier connected to the first RF filter to amplify the received RF signal;
an RF-to-IF mixer connected to the RF amplifier to downconvert the received RF signal into an intermediate frequency (IF) signal by mixing the received RF signal with a local oscillator (LO) signal;
an IF filter connected to an output of the RF-to-IF mixer to filter the IF signal; and
an IF amplifier connected to the IF filter to receive the filtered IF signal and output an amplified IF signal.

9. The radar system according to claim 1, wherein the digital signal received from the second omnidirectional antenna is time-delayed to compensate for time consumed by multiplication of the digitized IF signal received by the first omnidirectional antenna and transform the digitized IF signal received by the second omnidirectional antenna into a reference signal;
the DSPC comprises a digital-signal-processor (DSP) connected to the FPGA to receive the output signals of the desired modal order and phase slopes and the output reference signal for further processing; and the DSPC comprises a microcontroller connected to the FPGA and the DSP to monitor voltages and temperature of the DSPC.

10. The radar system according to claim 1, wherein the exciter module is further configured and operable to generate and distribute local oscillator (LO) signals or transmission signals (Tx).

11. The radar system according to claim 10, wherein the exciter module comprises a distribution mechanism configured to distribute the LO signals to the Rx/Tx modules.

12. The radar system according to claim 1, wherein the exciter module comprises:
a master oscillator that generates clock signals;
an RF Tx filter;
a Tx chain synthesizer module having an output connected to the RF Tx filter to filter any unwanted signals that are present at the output of the Tx chain synthesizer module and output a filtered signal;
an LO chain synthesizer module;
a clock distributor module connected to the master oscillator and configured to distribute the clock signals to the antenna elements, the Rx/Tx modules, the DSPC, the Tx chain synthesizer module and the LO chain synthesizer module;
an RF Tx power divider having output ports each connected directly to a respective one of the Rx/Tx modules; and
an RF amplifier connected to an output of the RF Tx filter to amplify the filtered signal from the RF Tx filter to output an amplified signal, and direct the amplified signal toward an RF Tx power divider.

13. The radar system according to claim 1, wherein the one or more antenna systems is configured for estimation of the direction-of-arrival (DOA) of a signal that arrives from the horizon within an azimuth of from 0° to 360° and a range of from −45° to 45° elevation below and above the horizon, respectively.

14. The radar system according to claim 1, wherein the antenna system further comprises a second omnidirectional antenna, which is located coaxially about a predefined vertical axis in relation to the first omnidirectional antenna and separated therefrom at a predefined vertical distance; wherein:
the first omnidirectional antenna is configured and operable to receive an arriving signal and transform the received signal into a plurality of output signals that are processed in the DSPC to generate at least two signals: a first signal and a second signal with opposite phase slope wherein the phases of the first and second signals are proportional to an azimuth angle of the arriving signal;
the second omnidirectional antenna is configured and operable to receive an arriving signal and transform the received signal into a reference signal of a reference phase, the reference phase has a zero phase-slope and is independent of an azimuth angle of the arriving signal;
the phases of first and second signals are shifted from the reference phase by a phase shift that depends upon an elevation direction of the arriving signal, corresponding to the distance between the first and second omnidirectional antennas;
the antenna system is configured and operable to calculate at least two phase differences: a first phase difference $\Delta_1$ between the phase of the first signal and the reference phase, and a second phase difference $\Delta_2$ between the phase of the second signal and the reference phase, each one of the phase difference includes a first phase component proportional to the azimuth angle of the arriving signal and a second phase component corresponding to the elevation angle of the arriving signal, and the DSPC is further configured and operable to determine the azimuth and the elevation angles of the arriving signal from the phase differences.

15. The radar system according to claim 14, wherein the first omnidirectional antenna element is connected to a circular waveguide (CWG).

16. The radar system according to claim 15, wherein the circular waveguide (CWG) is configured to guide a $TE_{11}$ and $TE_{21}$ or higher-order circular-waveguide-modes received from the first omnidirectional antenna, and is of a diameter sufficient to allow propagation of the higher order circular-waveguide-modes.

17. The radar system according to claim 15, wherein the CWG comprises a plurality of output feeds.

18. The radar system according to claim 14, wherein the first omnidirectional antenna is a multimodal omnidirectional antenna comprising a biconical horn antenna.

19. The radar system according to claim 6, wherein the second omnidirectional antenna is a biconical dipole antenna.

20. The radar system according to claim 6, wherein the second omnidirectional antenna is coaxially located above the first omnidirectional antenna, and a feed line is coaxially inserted through a waveguide portion of the first omnidirectional antenna.

21. The radar system according to claim 1, wherein the antenna system is configured to output a plurality of output signals, digitally processed so as to generate a plurality of phase modes.

22. The radar system according to claim 1, wherein the antenna system is configured to estimate the DOA of a wireless RF signal.

23. A method for special detection, identification and tracking of one or more objects or targets comprising operating the radar system as defined in claim 1.

24. A method for detection, identification and tracking of one or more objects or targets comprising:
providing the radar system as defined in claim 1, wherein the plurality of antenna elements comprises a first omnidirectional antenna and a second omnidirectional antenna;
transmitting a radio frequency (RF) signal through a feed of the first omnidirectional antenna;
receiving, at one or more antenna elements of the first omnidirectional antenna an arriving RF signal reflected off an object;
converting the received signal into a digital intermediate frequency (IF) signal;
multiplying, in a digital signal processing card (DSPC), the digitized IF signal from one or more antenna elements of the first omnidirectional antenna with complex weights and summing together the weighted IF signal from the one or more antenna elements to generate a first signal and a second signal with opposite phase slope wherein the phases of the first and second signals are proportional to an azimuth angle of the arriving signal;
receiving the arriving signal at the second omnidirectional antenna;
converting the arriving signal into a digital reference signal of a reference phase, the reference phase having a zero phase-slope and being independent of the azimuth angle of the arriving signal;
shifting the phases of first and second signals from the reference phase by a phase shift that depends upon an elevation direction of the arriving signal, corresponding to the distance between the first and second omnidirectional antennas;
calculating at least two phase differences comprising a first phase difference $\Delta_1$ between the phase of the first signal and the reference phase, and a second phase difference $\Delta_2$ between the phase of the second signal and the reference phase, wherein each one of the phase difference includes a first phase component proportional to the azimuth angle of the arriving signal and a second phase component corresponding to the elevation angle of the arriving signal, and
calculating the azimuth and the elevation angles of the arriving signal from the phase differences;
wherein the step of transmitting a radio frequency signal through a feed of the first omnidirectional antenna is performed by exciting microwave signals in one or more antenna elements of the first omnidirectional antenna so as to steer radiated energy into one or more predefined directions.

25. The method according to claim 24, wherein the step of multiplying further comprises summing the complex weighted signals to form a third signal with a +2 phase slope;
wherein the step of calculating at least two phase differences further comprises extracting a third phase difference between the third signal and the reference phase, and
wherein the first, second and third phase difference are used to calculate first-order and second-order elevation contributions.

* * * * *